July 21, 1936.   H. ROTHE   2,048,409

ELECTRON DISCHARGE TUBE

Filed Nov. 13, 1933

INVENTOR
HORST ROTHE
BY
ATTORNEY

Patented July 21, 1936

2,048,409

UNITED STATES PATENT OFFICE 2,048,409

ELECTRON DISCHARGE TUBE

Horst Rothe, Berlin, Germany, assignor to Telefunken Gesellschaft für Drahtlose Telegraphie m. b. H., Berlin, Germany, a corporation of Germany Application November 13, 1933, Serial No. 697,778
In Germany July 22, 1932

2 Claims. (Cl. 250—27.5)

The present invention relates to a special shaping of the electrode system of a discharge tube, in which the control grid is formed as double-holder grid, and one of its objects is to obtain uniform conditions of the gain-reciprocal $(1/\mu)$ along the periphery of the cathode.

Figure 1:
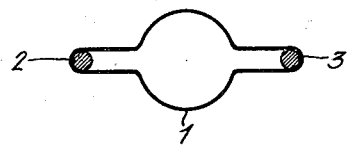

In tubes in which, for the purpose of obtaining a great steepness the control grid is spaced around the cathode at a small distance, and which require a particularly rigid mounting of the grid primarily for the purpose of eliminating the so-called microphonic effect of the tubes, it is known to construct the control grid in the form of a so-called double-holder or double-stay grid. Figure 1 shows such a grid in plan view, the grid windings 1 being fastened to the two supporting wires or stays 2, 3, preferably disposed opposite each other. In order to stiffen the structure and more favorably adapt the surface of the grid to the periphery of the cathode for more effective controlling action, the grid wires are flattened out in the manner shown in the figure, so that a sort of strengthening ribs are formed. It is evident that due to this grid shape the course of the field about the cathode due to the grid stays is distorted in such a manner that the equi-potential surface takes the form of a more or less elliptic surface. If, as is customary, the electrode surrounding the control grid be formed as a cylinder, a gain-reciprocal of variable value would be obtained along the periphery; the gain-reciprocal in the plane of the grid holders, therefore, would for instance be smaller than at other places. This would result in a flattening of the anode-current grid-potential characteristic having no longer a sharp lower bend and extending far into the region of the negative grid potential.

The present invention affords obtaining of uniform conditions of the gain-reciprocal along the entire periphery of the cathode in that the electrodes outside the control grid are shaped in such manner that the field distortion caused by the grid holders is compensated. Electrodes of oval or rectangular cross sections are known as such. In accordance with the invention, however, the shape and position of these electrodes is determined by the respective shape of the control grid.

Figure 2:
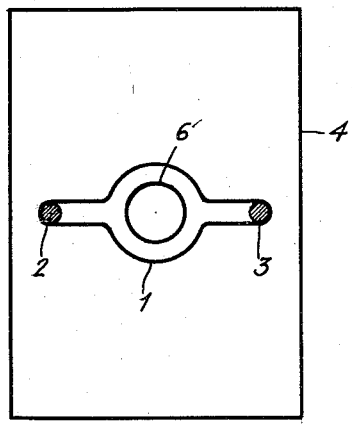
Figure 3:
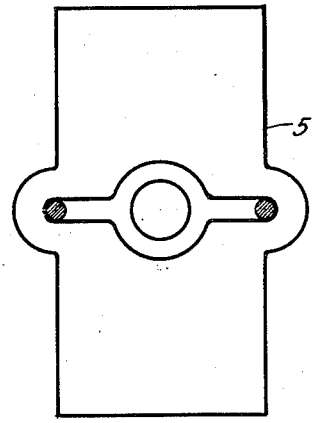

Figures 2 and 3 disclose top plan views of a three electrode system which fairly well fulfill the requirement as to a uniform gain-reciprocal along the periphery of the cathode and the restoration of approximately cylindrical potential planes. In Figure 2 the anode 4 is of rectangular shape, the shorter sides of which are parallel to the plane through the grid stays or holders 2, 3. According to Figure 3 the anode 5 takes the form of a narrower rectangle, the longer sides thereof being bulged in order to secure the proper distance from the grid holders.

Figure 4:
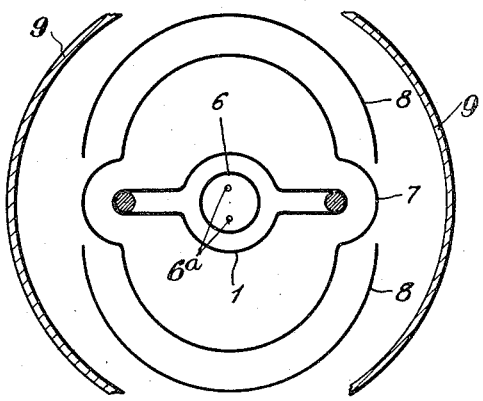

Obviously the same principles must also be applied to other electrodes surrounding the control grid, for example, the screen grid, suppressor grid. Figure 4 shows a plan view of an electrode system having a control electrode 1, formed as double holder grid, an equi-potential cathode 6 surrounding the heater element 6a, a screen grid 7, and anode 8, all enclosed within the envelope 9, partly broken away. The essential feature of this arrangement resides in the fact, that the distance of the screen grid from the cathode 6 is smaller in the proximity of the grid holders than at the other parts of the periphery. Then the shape of the anode is of relatively small concern.

While the presently described examples of the mode of execution are related to cathodes of cylindrical cross section, whereby the cathode may be directly or indirectly heated, the inventive idea of producing approximately uniform conditions of the gain-reciprocal along the entire periphery of a cathode, is applicable in the same sense also to cathodes shaped in any other manner, such as flat cathodes, band cathodes or cathode systems consisting of several filaments disposed in one plane.

What is claimed is:

1. An electron discharge tube comprising a cathode, a substantially cylindrical grid electrode surrounding the cathode, said electrode being provided with a pair of support rods which are situated outside the cylindrical grid surface, and an elliptically-shaped electrode with its major axis at right angles to the plane of the grid support rods surrounding the grid electrode, said last mentioned electrode having bulged portions opposite the support rods and extending in the same direction as the support rods.

2. An electron discharge tube comprising an indirectly heated cathode, a substantially cylindrical grid electrode uniformly surrounding the cathode, said electrode being provided with a pair of support rods which are situated outside the cylindrical grid surface, an elliptically-shaped screen electrode with its major axis at right angles to the plane of the grid support rods surrounding the grid electrode, said screen electrode having bulged portions opposite the support rods and extending in the same direction as the support rods and a plate electrode substantially surrounding the screen electrode.

HORST ROTHE.